(12) United States Patent  
Rejniak et al.

(10) Patent No.: US 10,662,088 B2  
(45) Date of Patent: May 26, 2020

(54) APPARATUS AND METHOD FOR SELF-CLEANING SALT CELL CHLORINATOR

(71) Applicants: Brian Rosser Rejniak, Yorba Linda, CA (US); John Alan Rejniak, Yorba Linda, CA (US)

(72) Inventors: Brian Rosser Rejniak, Yorba Linda, CA (US); John Alan Rejniak, Yorba Linda, CA (US)

( * ) Notice: Subject to any disclaimer, the term of this patent is extended or adjusted under 35 U.S.C. 154(b) by 17 days.

(21) Appl. No.: 16/393,706

(22) Filed: Apr. 24, 2019

(65) Prior Publication Data

US 2019/0248680 A1    Aug. 15, 2019

(51) Int. Cl.
    *C02F 1/46*        (2006.01)  
    *C02F 1/461*     (2006.01)  
    *C02F 1/467*     (2006.01)  
    *C02F 103/42*   (2006.01)

(52) U.S. Cl.  
CPC ........ *C02F 1/46109* (2013.01); *C02F 1/4674* (2013.01); *C02F 2001/46119* (2013.01); *C02F 2103/42* (2013.01); *C02F 2201/4612* (2013.01)

(58) Field of Classification Search  
CPC .. C25B 15/00; C25B 9/12; C25B 1/26; C25B 1/00; C25B 9/04; C25B 9/06; G01N 27/38; G07F 13/00; C02F 1/467; C02F 1/461; C02F 1/46  
See application file for complete search history.

(56) References Cited

U.S. PATENT DOCUMENTS

| | | | | |
|---|---|---|---|---|
| 3,006,826 A | * | 10/1961 | Roller | ........... C02F 1/46109 205/508 |
| 3,822,149 A | * | 7/1974 | Pan | ........... H01M 10/4214 429/406 |
| 2013/0161202 A1 | * | 6/2013 | Babych | ........... C02F 1/4674 205/755 |

* cited by examiner

*Primary Examiner* — Cameron J Allen  
(74) *Attorney, Agent, or Firm* — Cionca IP Law, P.C.; Marin Cionca (57) ABSTRACT

A salt cell chlorinator adapted to run a self-cleaning program by scraping off residual buildup, the salt cell chlorinator having: electrodes arranged a line within a housing, each electrode having: a round shape; a first face; and a second face; rotary wipers arranged within the line of the electrodes, such that each rotary wiper is adapted to make contact with at least one electrode of the electrodes, wherein each rotary wiper is adapted to rotate on the first face or the second face of the electrodes; a drive motor adapted to cause a rotation of the rotary wipers; a control panel adapted to customize the self-cleaning program to run at a predetermined time interval; wherein the rotation of the rotary wipers removes the residual buildup from the electrodes; and wherein the predetermined time interval occurs between occurrences of the chlorination program.

20 Claims, 10 Drawing Sheets

APPARATUS AND METHOD FOR SELF-CLEANING SALT CELL CHLORINATOR

BACKGROUND OF INVENTION

1. Field of the Invention

The invention relates generally to pool and spa maintenance and more specifically to pool and spa salt cell chlorinator cleaning.

2. Description of the Related Art

Swimming pool or spa salt cells require cleaning a minimum of approximately three to four times per year, and many are set to a default programming to illuminate a "clean/check cell" LED indicator every 500 hours (or approximately every 62 days). The frequency of cleaning may vary and may depend on several factors, including salt levels, pH, alkalinity, calcium levels, phosphates, organic buildup, cleanliness of the electrodes, and age of the salt cell generator. The cleaning process can be difficult, messy, and time-consuming. Additionally, the current methods for cleaning may require soaking salt cell electrodes in a muriatic acid or a vinegar solution, both of which can prematurely cause the salt cells to fail by eroding the metallic coating on the electrode cell blades. Salt cell chlorination requires a minimum salt level in the water (usually 3,000-4,000 ppm). Salt traveling through electrodes generates chlorine, a derivative of salt. This chlorination process causes the electrodes to form layers of calcium scale buildup in the salt cell, which can greatly reduce the performance of the salt cell chlorine generation process. It may be required to power down the filtration system (pump) and disconnect and remove the salt cell from the pool plumbing during the cleaning process. Then, the salt cell may need to be cleaned via harsh chemicals, manually scraping of the electrode cell blades themselves (such as with a plastic or wooden tool), and washing the electrode cell blades with a high-pressure hose nozzle. This process can erodes the coating on the electrodes, which can therefore result in the shortening of the salt cell's life.

Then, salt cells need to be reinstalled into the plumbing, and the electrical cable reconnected to ensure no leaks occur at the unions. Salt cells fail primarily due to lack of proper maintenance (cleaning). Thus, it is very important to check salt cells regularly for excessive calcium buildup and prevent the excess calcium from forming. This process can be costly. For example, checking for calcium build up could cost an additional $25 each time a pool maintenance person performs this service. For a homeowner, it can take over 30 minutes each time to complete this process.

While some self-cleaning salt cell chlorinators may be known, they may use a process of reverse voltage polarity, sometimes referred to as "cell-reversing." This process may be ineffective and may simply elongate the period of interval cleanings without efficiently fully cleaning the salt cell, and thus still requiring manual cleaning.

Therefore, there is a need for a solution to these problems.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a rotary self-cleaning salt cell chlorinator is provided, having electrode plates, rotary wipers, and a drive shaft configured to turn the rotary wipers. The rotary wipers may each be provided with a first blade and an opposite second blade, and the electrode plates may be provided with a round shape, such that the rotary wiper blades rotating on a face or surface of the electrode plates may make contact with all portions of the electrode plate surface, such that buildup on the electrode plates are cleaned and scraped off by the blades. A rotary wiper may be provided sandwiched between two electrode plates, such that both a front side and a rear side of the rotary wiper is flush with the surface of a first electrode plate and a second electrode plate, and thus a single rotary wiper is configured to clean two electrode plates simultaneously. The rotary self-cleaning salt cell may also be provided with a control panel configured to allow programming of the salt cell, such that the salt cells can perform a cleaning cycle at a predetermined or desired interval, which may be every 112 hours or approximately 14 days. The drive motor may attach directly to the housing containing the components of the self-cleaning salt cells, which may allow for removal of the components for servicing. Thus, an advantage may be that need for a manual, time-consuming process of disassembling and cleaning a salt cell may be reduced or eliminated. Another advantage may be that the buildup of calcium and other residual materials on the salt cell may be prevented by frequent rotary cleanings. Another advantage may be that the round shape of the electrode plates may allow for the rotary wipers to make contact with all surfaces of the electrode plate, such that no area is untouched during the cleaning process. Another advantage may be that a user may not need to set a cleaning cycle and allow the salt cell to automatically clean at a set or predetermined time interval. Another advantage may be that a user can set a cleaning cycle to take place at a frequent enough interval to prevent any buildup of calcium or other residual materials on the electrodes. Another advantage may be that a user can easily and efficiently remove components from the salt cell house should servicing or replacement of parts be necessary. Another advantage may be that time spent on maintenance and cleaning of a salt cell chlorinator may be reduced or eliminated for a user.

In another aspect, a salt cell chlorinator adapted to run a self-cleaning program to self-clean by scraping off residual buildup is provided, the salt cell chlorinator comprising: a housing having: a front end; a rear end; a top side; a bottom side; a water inlet pipe; and a water outlet pipe; a plurality of electrodes arranged a line within the housing, each electrode of the plurality of electrodes having: a round shape; a first face; and a second face; a plurality of rotary wipers, wherein each rotary wiper of the plurality of wipers is arranged within the line of the plurality of electrodes, such that each rotary wiper of the plurality wipers is adapted to make contact with at least one electrode of the plurality of electrodes, wherein each rotary wiper of the plurality of rotary wipers is adapted to rotate on the first face or the second face of an electrode of the plurality of electrodes; a drive motor adapted to cause a rotation of the plurality of rotary wipers; a control panel adapted to customize the self-cleaning program to run at a predetermined time interval; wherein the residual buildup is formed on the plurality of electrodes during running of a chlorination program; wherein the rotation of the plurality of rotary wipers removes the residual buildup from the plurality of electrodes; and wherein the predetermined time interval occurs between occurrences of the chlorination program. Thus, again, an advantage may be that need for a manual, time-consuming process of disassembling and cleaning a salt cell may be reduced or eliminated. Another advantage may be that the buildup of calcium and other residual materials on the salt cell may be prevented by frequent rotary cleanings. Another advantage may be that the round shape of the electrode plates may allow for the rotary wipers to make contact with all surfaces of the electrode plate, such that no area is untouched during the cleaning process. Another advantage may be that a user may not need to set a cleaning cycle and allow the salt cell to automatically clean at a set or predetermined time interval. Another advantage may be that a user can set a cleaning cycle to take place at a frequent enough interval to prevent any buildup of calcium or other residual materials on the electrodes. Another advantage may be that a user can easily and efficiently remove components from the salt cell house should servicing or replacement of parts be necessary. Another advantage may be that time spent on maintenance and cleaning of a salt cell chlorinator may be reduced or eliminated for a user.

In another aspect, a salt cell chlorinator adapted to run a self-cleaning program to self-clean by scraping off residual buildup is provided, the salt cell chlorinator comprising: a housing having: a front end; a rear end; a top side; a bottom side; a water inlet pipe; and a water outlet pipe; a plurality of electrodes arranged a line within the housing, each electrode of the plurality of electrodes having: a round shape; a first face; and a second face; a plurality of rotary wipers, wherein each rotary wiper of the plurality of wipers is arranged within the line of the plurality of electrodes, such that each rotary wiper of the plurality wipers is adapted to make contact with at least one electrode of the plurality of electrodes, wherein each rotary wiper of the plurality of rotary wipers is adapted to rotate on the first face or the second face of an electrode of the plurality of electrodes; a drive motor adapted to cause a rotation of the plurality of rotary wipers; a drive shaft passing through each electrode of the plurality of electrodes and passing through each rotary wiper of the plurality of rotary wipers; a control panel adapted to customize the self-cleaning program to run at a predetermined time interval; wherein the residual buildup is formed on the plurality of electrodes during running of a chlorination program; wherein the drive motor rotates the drive shaft; such that the rotation of the plurality of rotary wipers is caused; wherein the rotation of the plurality of rotary wipers removes the residual buildup from the plurality of electrodes; and wherein the predetermined time interval occurs between occurrences of the chlorination program. Thus, again, an advantage may be that need for a manual, time-consuming process of disassembling and cleaning a salt cell may be reduced or eliminated. Another advantage may be that the buildup of calcium and other residual materials on the salt cell may be prevented by frequent rotary cleanings. Another advantage may be that the round shape of the electrode plates may allow for the rotary wipers to make contact with all surfaces of the electrode plate, such that no area is untouched during the cleaning process. Another advantage may be that a user may not need to set a cleaning cycle and allow the salt cell to automatically clean at a set or predetermined time interval. Another advantage may be that a user can set a cleaning cycle to take place at a frequent enough interval to prevent any buildup of calcium or other residual materials on the electrodes. Another advantage may be that a user can easily and efficiently remove components from the salt cell house should servicing or replacement of parts be necessary. Another advantage may be that time spent on maintenance and cleaning of a salt cell chlorinator may be reduced or eliminated for a user.

In another aspect, a method of maintaining a salt cell chlorinator in a pool system is provided, the salt cell chlorinator being adapted to run a self-cleaning program to self-clean by scraping off residual buildup, and the salt cell chlorinator comprising: a housing having: a front end; a rear end; a top side; a bottom side; a water inlet pipe; and a water outlet pipe; a plurality of electrodes arranged a line within the housing, each electrode of the plurality of electrodes having: a round shape; a first face; and a second face; a plurality of rotary wipers, wherein each rotary wiper of the plurality of wipers is arranged within the line of the plurality of electrodes, such that each rotary wiper of the plurality wipers is adapted to make contact with at least one electrode of the plurality of electrodes, wherein each rotary wiper of the plurality of rotary wipers is adapted to rotate on the first face or the second face of an electrode of the plurality of electrodes; a drive motor adapted to cause a rotation of the plurality of rotary wipers; a control panel adapted to customize the self-cleaning program to run at a predetermined time interval; wherein the residual buildup is formed on the plurality of electrodes during running of a chlorination program; wherein the rotation of the plurality of rotary wipers removes the residual buildup from the plurality of electrodes; and wherein the predetermined time interval occurs between occurrences of the chlorination processes; the method comprising the steps of: installing the salt cell chlorinator in the pool system; programming the salt cell chlorinator using the control panel to customize the self-cleaning program to run at the predetermined time interval, wherein the self-cleaning program is set to run for a predetermined length of time; and setting the salt cell chlorinator using the control panel to run the chlorination program, wherein the chlorination program is adapted to stop when the self-cleaning program is running, and wherein the chlorination program is adapted to restart when the self-cleaning program is finished. Thus, again, an advantage may be that need for a manual, time-consuming process of disassembling and cleaning a salt cell may be reduced or eliminated. Another advantage may be that the buildup of calcium and other residual materials on the salt cell may be prevented by frequent rotary cleanings. Another advantage may be that the round shape of the electrode plates may allow for the rotary wipers to make contact with all surfaces of the electrode plate, such that no area is untouched during the cleaning process. Another advantage may be that a user may not need to set a cleaning cycle and allow the salt cell to automatically clean at a set or predetermined time interval. Another advantage may be that a user can set a cleaning cycle to take place at a frequent enough interval to prevent any buildup of calcium or other residual materials on the electrodes. Another advantage may be that a user can easily and efficiently remove components from the salt cell house should servicing or replacement of parts be necessary.

Another advantage may be that time spent on maintenance and cleaning of a salt cell chlorinator may be reduced or eliminated for a user.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 222 and 322, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

Figure 1:
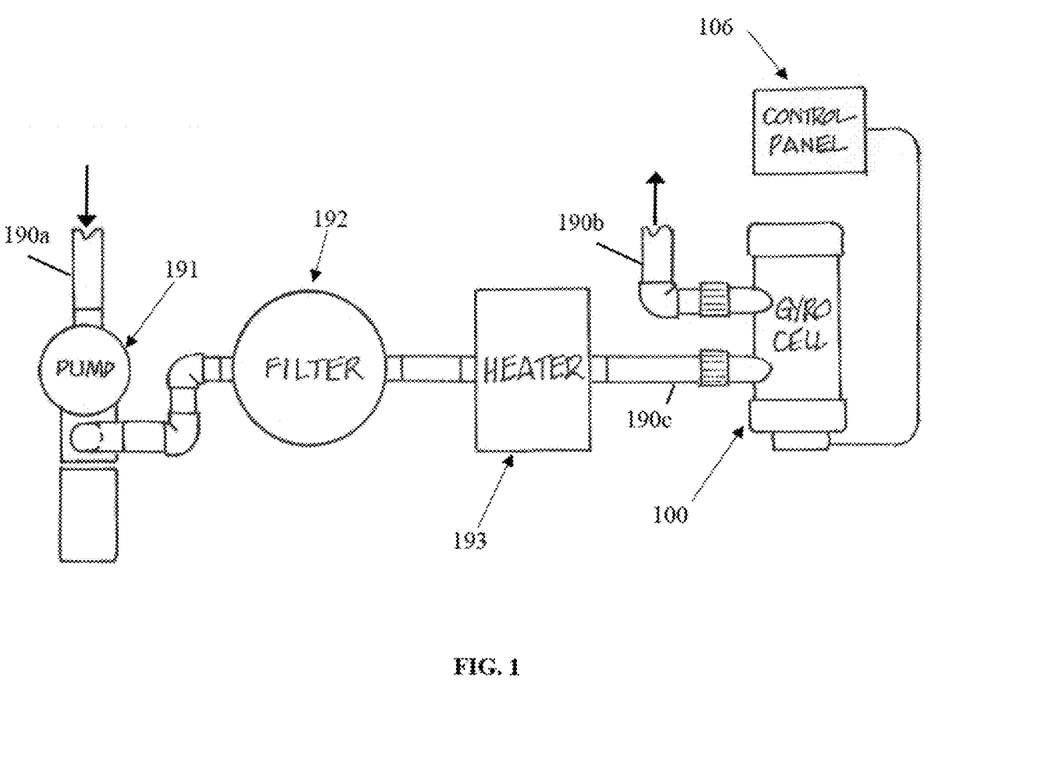
FIG. 1 illustrates a top plan schematic view of an exemplary pool equipment array or system, according to an aspect.

FIG. 1 illustrates a top plan schematic view of an exemplary pool equipment array or system ("pool equipment array," "pool equipment system," "pool system," or "system") with an integrated rotary self-cleaning salt cell chlorinator ("rotary self-cleaning salt cell," "rotary salt cell," "self-cleaning chlorinator," "self-cleaning salt cell," or "salt cell chlorinator") 100, according to an aspect. The self-cleaning salt cell chlorinator may also be referred to as a "Gyrocell," derived from the rotational movements of the self-cleaning salt cell. The arrangement shown as an example in FIG. 1 shows that a self-cleaning salt cell 100 may replace a traditional salt cell chlorinator in a typical pool equipment plumbing arrangement. The rotary self-cleaning salt cell 100 may be used in any pool or spa system and may self-clean by the rotation of rotary wipers to scrape away residual buildup, for example. The rotation of the rotary wipers may occur according to a set program, for example, which may be every 112 hours or approximately 14 days. Each cleaning session may be approximately two minutes long, for example.

A pump 191 of the system may pull water from the pool into a water intake pipe 190a, which may be an intake pipe used for bringing in water from the pool into the pool equipment system. Then, the water may travel through a filter 192 and a heater 193. Next, the water may enter a self-cleaning salt cell 100 via the salt cell water intake pipe ("salt cell water intake pipe," or "salt cell intake pipe") 190c, where the water may be appropriately chlorinated, as is known to those of ordinary skill in the art. Once the water has been chlorinated, the water may exit the self-cleaning salt cell 100 via a water outlet pipe 190b, and next be pumped back into the pool.

A self-cleaning salt cell 100 may be provided with a control panel 106. The control panel 106 may be equipped with any suitable salt cell chlorinator electronics and software, as is known to those of ordinary skill in the art. The control panel 106 may also be equipped with additional electronics and software that may be used for controlling the frequency of the self-cleaning cycle or program ("self-cleaning cycle," "self-cleaning program," "cycle," or "program") of the self-cleaning salt cell 100. The frequency of the self-cleaning program may be determined or set by a pool maintenance person, a self-cleaning salt cell 100 installer, or any other user of the self-cleaning salt cell 100. Thus, a self-cleaning salt cell 100 may be automatically set to self-clean at predetermined or desired intervals, such that no user action is needed to maintain the self-cleaning salt cell 100 after initial programming of the self-cleaning salt cell 100.

Figure 2:
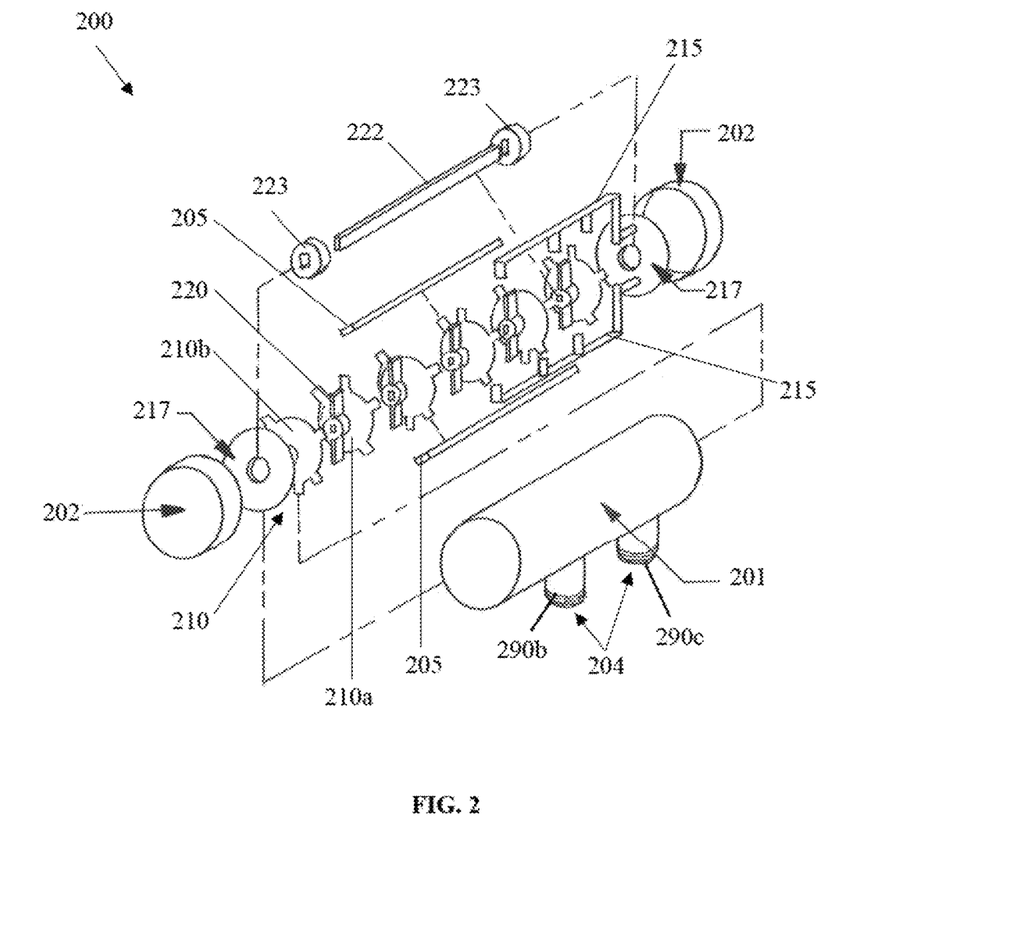
FIG. 2 illustrates an exploded perspective view of a self-cleaning salt cell, according to an aspect.

FIG. 2 illustrates an exploded perspective view of a self-cleaning salt cell 200, according to an aspect. The self-cleaning salt cell 200 may be provided with the following exemplary components: a salt cell housing ("salt cell housing," "cell housing," or "housing") 201, salt cell end covers ("end covers," "electronics covers," or "covers") 202, union fittings ("union fittings") 204 for input and output lines or pipes, electrode plate mounting rails or retainers ("electrode plate mounting rail," "retainers," or "mounting rails") 205, electrode plates ("electrode plates," or "plates") 210, electrode busbars 215, salt cell end plates ("end plates") 217, rotary wiper blades ("rotary wiper blades," "rotary blades," "wiper blades," "rotary wipers," or "wipers") 220, a drive shaft 222 for the wipers 220, and end flanges 223. As shown, the housing 201 may house the various components, such as the plurality of electrodes 210, shown in FIG. 2. The housing 201 may have a front end that may receive an end cover 202, a rear end that may receive an end cover 202, a top side, and a bottom side. The housing may also be provided with a water inlet pipe 290c and a water outlet pipe 290b. It should be noted that a self-cleaning salt cell 200 may also be provided with additional components, as disclosed hereinbelow. As an example, the rotary salt cell may be removable from the housing 201 for servicing. Securing the salt cell within the housing 201 may be done by unions and rubber O-rings, for example.

The drive shaft 222 may be associated with the rotary wipers 220, such that the drive shaft may turn the rotary wipers 220, which may be by way of a drive motor (such as, for example, a "Goldline" actuator). As another example, an optional drive system may be a mechanical-hydro impeller and reduced-speed gear driven system.

The end flanges 223 may serve as the end bearings for the drive shaft 222. Two retainers 205 are shown as examples in FIG. 2 for visual clarity; however, it should be understood that any other suitable number of retainers 205 may be used. As an example, four retainers 205 may be used to secure the electrode plates 210.

Each electrode plate 210 may be provided with a rotary blade 220, wherein the rotary blade 220 is configured to rotate on the face of the electrode to be able to wipe the entire surface of the electrode face.

As is known to those of ordinary skill in the art, the purpose of a salt cell chlorinator 200 is to convert salt (NaCl) to chlorine (Cl). This may typically be accomplished by passing water through the salt cell chlorinator 200 and over electrode plates 210, which may be coated with a metal. As an example, the electrode plates 210 may be solid titanium and they may be coated with either ruthenium or iridium, which are naturally occurring metals. The control panel (as shown by 106 in FIG. 1) may then send an electrical charge to the electrode plates 210 via the electrode busses 215, which causes electrolysis to occur, thus producing chlorine.

Over time, residual material, such as calcium scale, may build up on the electrode plates 210, creating what is commonly referred to as buildup. Buildup on a salt cell chlorinator may necessitate periodic cleaning of the salt cell chlorinator in order to maintain optimal operation of the salt cell. To clean a traditional salt cell, the electrode plates may be submerged in a mild acid, which eats away at the electrode plates. The metallic coating on the electrode plates 210 can erode during this type of cleaning process, which may be damaging to the function of the salt cell chlorinator. A well-maintained salt cell chlorinator, which is not self-cleaning, could last 3-7 years and may have a replacement cost of $700-$1100.

The self-cleaning salt cell chlorinator 200 shown and described when referring to FIG. 2 may be cleaned using a gentler cleaning method than a method using acid. A gentler cleaning method may result an extended life compared to a traditional salt cell chlorinator. To automatically clean the electrode plates 210, a self-cleaning salt cell 200 may activate the rotary wipers 220 to scrape built-up calcium scale or other residual materials off of the electrode plates 210 (as will be described further when referring to FIGS. 3-7). The rotary blade 220 may be constructed from non-metallic materials such as hard plastic or any other suitable type of materials that are not likely to damage the metallic coating on the electrode plates 210. The material used for the construction of the rotary wipers 220 may be durable enough to be able to withstand rotation and scraping of the calcium scale and other buildup. This method may be gentler than acid submersion cleaning because the coating on the electrode plates 210 may experience little to no erosion. The interval between self-cleanings may be short relative to the manual cleanings required by typical or traditional salt cells. For example, while typical or traditional salt cells or known self-cleaning salt cells using reverse voltage polarity may require cleaning every 3-4 months, the self-cleaning program for the self-cleaning salt cell may occur every 14 days. This may help to ensure that the quantity of calcium scale buildup is small, such that the rotary wipers 220 may more easily remove the calcium scale and other buildup. Another advantage to a shorter interval may be that the performance of the salt cell chlorinator 200 is consistent and optimal. The electrode plates 210 may be provided with a flat, circular shape such that the rotary wipers 220 may be able to reach all portions of the face of the electrode plate 210 while scraping off the calcium scale buildup, or other residual materials. Thus, the circular shape may be advantageous over other shapes; as an example, the rotary wipers may be unable to reach and clean the corners of a square-shaped electrode plate.

The electrode plates 210 may serve as either anodes or cathodes, as is known to those of ordinary skill in the art. FIG. 2 shows the anode plates 210a with an electrode tab (shown by 411 in FIG. 4) positioned towards the top end of the plate, or in a 12 o'clock position on the face of the electrode, while the cathode plates 210b are shown with an electrode tab (shown by 411 in FIG. 4) positioned towards the bottom end of the plate, or in a 6 o'clock position on the face of the electrode. Retainers 205 may hold electrode plates in place by being fitted onto the ends of the plates. The electrode plates 210, which may be anode plates and cathode plates, may be arranged or aligned in a line or in a plane. As an example, anode plates 210a and cathode 210b plates may be arranged in an alternating order, as shown in FIG. 2, wherein an anode plate 210a is followed by a cathode plate 210b, which is next followed by an anode plate, and so on.

It should be understood that a self-cleaning salt cell 200 may be manufactured, constructed, or otherwise provided in various sizes, such that a desired size may be appropriately selected in order to correspond to the volume of water in a pool. It should also be understood that the number and size of electrode plates 210, rotary wipers 220, and so on, may vary according to the size of the self-cleaning salt cell 200.

Figure 3:
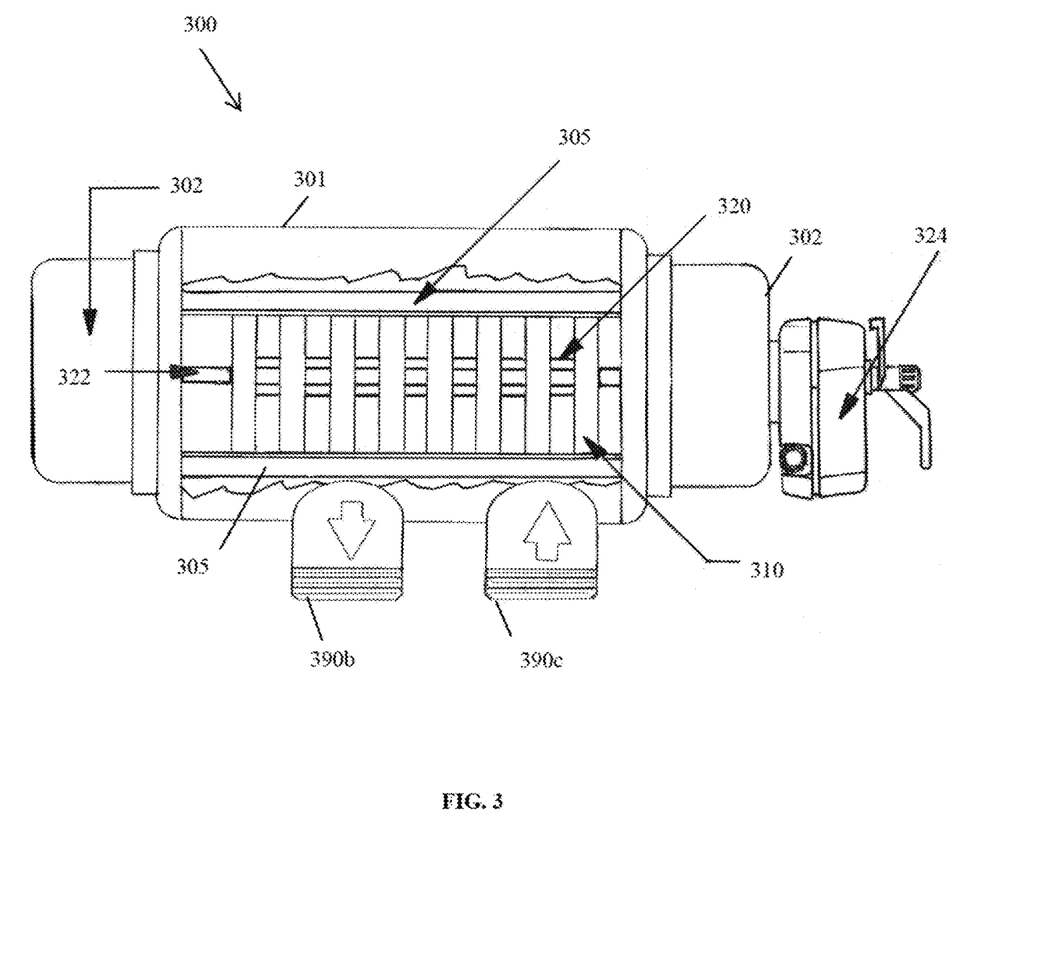
FIG. 3 illustrates a side elevation cutaway view of a self-cleaning salt cell, according to an aspect.

FIG. 3 illustrates a side elevation cutaway view of a self-cleaning salt cell 300, according to an aspect. The following exemplary components may be visible in this view: a salt cell housing 301, salt cell end covers 302, electrode plate mounting rails 305, electrode plates 310, rotary wiper blades ("wiper blades") 320, a drive motor 324, a drive shaft 322, a salt cell water intake pipe 390c, and a water outlet pipe 390b. The electrode busbars may not be visible in this view, as an example.

It should be noted that, for clarity of the drawing, the rotary wipers 320 are represented in a horizontal position, and it should be understood that the rotary wipers 320 may be fitted or arranged to rest or be flush against each electrode plate 310.

Again, as was previously discussed, a self-cleaning salt cell 300 may clean its electrode plates 310 by rotating the rotary wipers 320 to scrape off any built-up residual material from the electrode plates 310. To rotate the rotary wipers 320, the control panel (shown by 106 in FIG. 1) may activate a drive motor 324 to rotate a drive shaft 322, which in turn rotates the rotary wipers 320. The drive shaft 322 may pass through each electrode of the plurality of electrodes 310, and pass through each rotary wiper of the plurality of rotary wipers 320, and the drive motor may rotate the drive shaft, such that a rotation of the plurality of rotary wipers is caused. As an example, a low-voltage, high-torque drive motor 324 may be used. As another example, a hydromechanical drive may be used to turn the rotary wipers 320 (as will be discussed further when referring to FIGS. 8-9). The drive motor 324 may be configured to turn or rotate the drive shaft 322 and thus the rotary wiper blades 320 at 90 degrees to create a half-turn, or 180 degrees to create a full turn, when a rotary wiper having a first blade and a second, opposite blade is provided. The drive system may be rotated in any or both directions, for example. As another example, an optional mechanical drive system may also be used with the self-cleaning salt cell 300. The drive shaft 322 may have a first end and a second end, which may each be attached to an end plate (shown by 217 in FIG. 2) via ball bearings or roller bearings (not shown), flanges (shown by 223 in FIG. 2), and shaft seals (not shown). These components may be associated together by any suitable means known in the art. This method of securing the drive shaft 322 and endplates (shown by 217 in FIG. 2) together may allow the drive shaft 322 to effectively rotate the rotary wipers 320 while maintaining a secure, leakproof seal, which may prevent pool water from leaking out of the self-cleaning salt cell 300. The actuator or drive motor 324 may attach and secure directly to the cell housing 301, which may allow for removal of the drive motor 324 for service. The actuator or drive motor 324 may use a hydrophobic stem O-ring or rings, or a shaft seal. The rotary blades 320 and the salt cell electrodes 310 may also separate from the cell housing 301 for service or replacement. Components that attach to the actuator or drive motor 324 may be constructed from plastic-coated metal or high-strength plastic such as PC polycarbonate or POM polyoxymethylene, for example.

The covers 302 may connect to the cell housing 301 via a large union type connection and may be protected from the weather and the elements with the use of O-rings helping to create a seal. Additionally, as shown by FIG. 3, pool water may enter the salt cell water intake pipe 390c through one of the union fittings (shown by 204 in FIG. 2) and exit out of the water outlet pipe 390b through a second union fitting (shown by 204 in FIG. 2).

Figure 4:
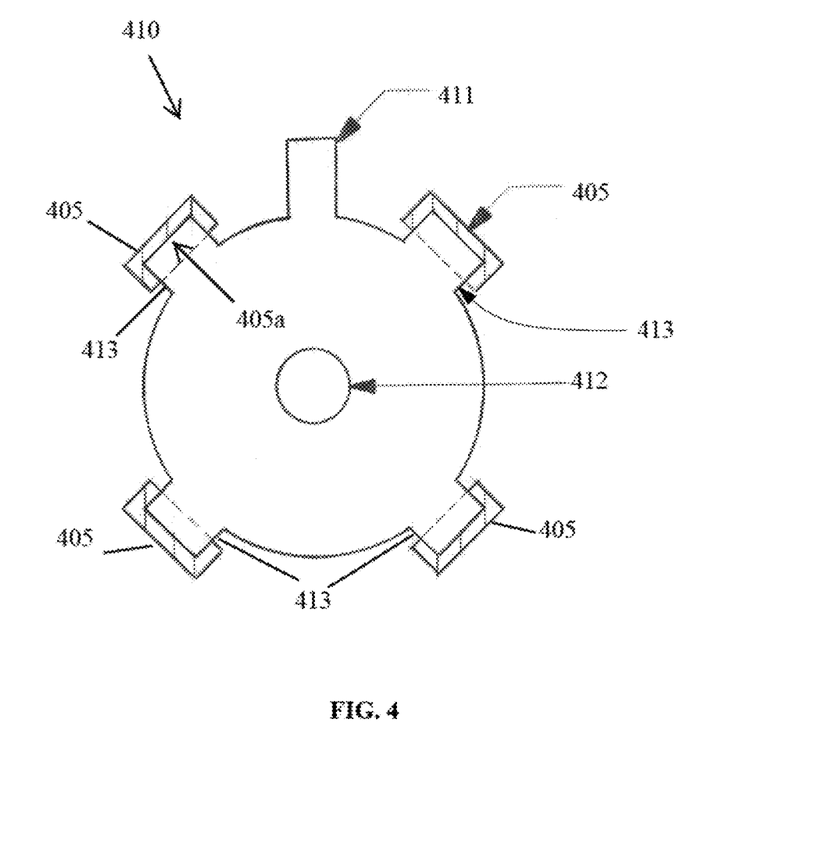
FIG. 4 illustrates a front elevation view of an electrode plate associated with mounting rails 405 shown in cross-section, according to an aspect.

FIG. 4 illustrates a front elevation view of an electrode plate 410 associated with mounting rails 405 shown in cross-section, according to an aspect. As shown, an electrode plate 410 may be provided with an electrode tab 411. Each electrode 410 may be provided with a round shape. As was previously discussed when referring to FIG. 2, an electrode plate 410 can serve as either an anode plate (shown by 210a in FIG. 2) or a cathode plate (shown by 210b in FIG. 2). In an assembled self-cleaning salt cell (such as the example shown by 300 in FIG. 3), an electrode plate may serve as an anode plate when the electrode tab 411 is positioned at the top end, for example. As another example, when the electrode tab 411 is positioned at the bottom end, the electrode plate 410 may serve as a cathode plate 210b.

Electrode busbars (shown by 215 in FIG. 2) may contact the electrode tabs 411, as will be discussed in further detail when referring to FIGS. 7 and 9. The electrode busbars may transfer an electric charge from the control panel to the electrode plates via the electrode tabs 411 making contact with the electrode busbars.

The electrode plate 410 may also be provided with mounting tabs 413. The mounting tabs 413 may be used to mount the electrode plate 410 to the salt cell housing (shown by 301 in FIG. 3). Additionally, the mounting tabs 413 may help to stabilize the electrode plates 410, such that the plates do not move or rotate during the self-cleaning process. To mount the electrode plate 410 to the housing, the mounting tabs 413 may be snapped or inserted into mounting rails 405, which may be provided with an inner groove shown by 405a configured to receive a mounting tab 413. The mounting rails 405 may be secured to the end plates (shown by 203 in FIG. 2) at both ends of the self-cleaning salt cell. It should be understood that a self-cleaning salt cell may be provided with the same number of mounting rails 405 as there are mounting tabs 413 provided on an electrode plate 410. For example, when the electrode plate 410 is provided with four mounting tabs 413, the housing may be provided with four mounting rails 405. It should be understood that the number of mounting tabs 413 and mounting rails 405 may vary according to a user's needs or according to the size of the self-cleaning salt cell, which may vary to accommodate various sizes of pools and spas. It should be understood that the number of electrode plates 410 provided for a self-cleaning salt cell may also vary according to the size of the self-cleaning salt cell, or other factors.

The electrode plate 410 may also be provided with a center bore hole ("center bore hole," "bore hole," or "center hole,") 412, which may be located at the center portion of an electrode plate 410. The electrode plate 410 may be constructed from a conductive material, while the mounting rails 405 may be constructed from non-metallic materials. Each mounting rail 405 may be provided with a first end and a second end, both of which may be associated with the end plates.

Figure 5A:
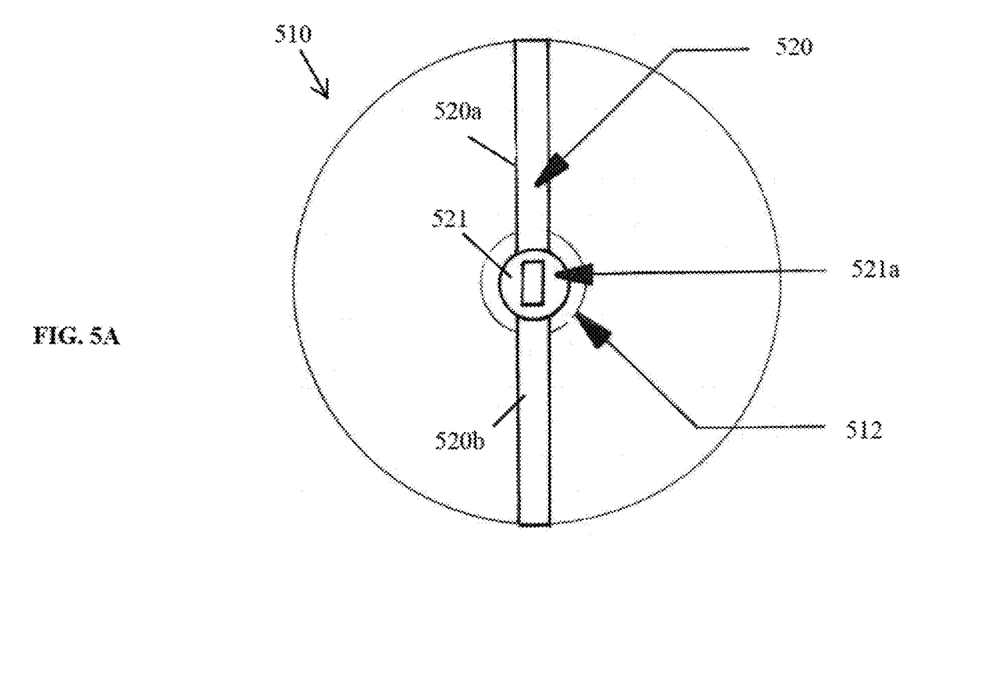
FIGS. 5A-5B illustrate a front elevation view of an electrode plate with a rotary wiper, and a side elevation view of the rotary wiper, according to an aspect.
Figure 5B:
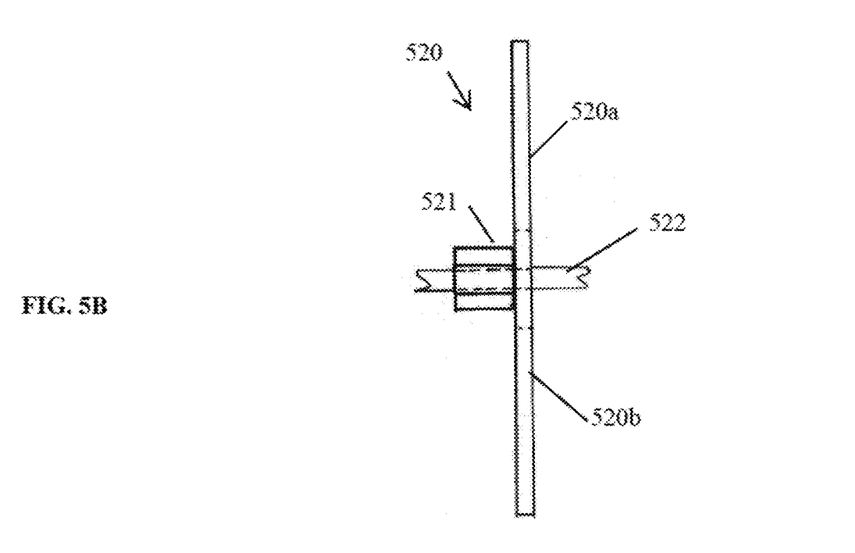

FIGS. 5A-5B illustrate a front elevation view of an electrode plate 510 with a rotary wiper 520, and a side elevation view of the rotary wiper 520, according to an aspect. The electrode plate 510 is shown in FIG. 5A without electrode tabs or mounting tabs for visual clarity, and similarly, the rotary wiper 520 is shown in FIG. 5B alone without the electrode plate 510 for visual clarity. The blades of the rotary wipers 520 may be designed to have equal symmetrical parts to ensure full coverage, to scrape or squeegee calcium and other buildup from both sides of the diameter, including the outside circumference, of the electrode plates 510.

As shown in FIG. 5A, a rotary wiper blade 520 may be positioned on the front face of the electrode plate 510, such that a slotted hub 521 of the rotary wiper 520 is centered within the center hole 512 of the electrode plate 510. The rotary wiper 520 may be provided with a first end and an opposite second end, wherein a first blade 520a is at the first end and a second blade 520b is at the second end. When the rotary wiper 520 is assembled on the electrode plate 510, the first end and the second end may be aligned with the edge of the electrode plate 510, and the rotary wiper 520 may be flush with the surface of the electrode plate 510 face. The flush mounting of the rotary wiper 520 with the electrode plate 510 may help to facilitate efficient cleaning of the electrode plate as the rotary wiper 520 passes over the surface of the plate.

Again, as was previously discussed, a motor-driven drive shaft 522 may turn the rotary blade 520, such that the blades 520a and 520b scrape off residual materials and buildup. Turning the rotary blade 520 may be accomplished by inserting the drive shaft 522 into the cutout 521a of the slotted hub 521. The center hole 512 may be larger than the slotted hub 521 such that the rotary blade 520 and drive shaft 522 can turn freely. It should be noted that, while the slotted hub 521 is shown to have a rectangular cutout 521a, the cutout 521a may be customized to fit any drive shaft 522. For example, the cutout 521a may be splined or keyed. An advantage may be that a keyed or splined slot in each rotary wiper 520 may help to maximize grip and prevent slipping of the components during a high-torque rotating operation.

The rotary wiper blade 520 is shown in a vertical position in FIG. 5A, which may be referred to as a "home position," with a first blade 520*a* in a 12 o'clock position (pointed towards the top side of the housing) and a second blade 520*b* in a 6 o'clock position (pointed towards the bottom side of the housing) and opposite to the first blade 520*a*. The rotary wiper blades may be in this position when the salt cell chlorination is running a chlorination program, and when the self-cleaning program is not running. The rotary wiper 520 may be in a horizontal position, wherein the rotary wiper is turned 90 degrees from the home position, such that the horizontal position is perpendicular to the vertical position. Rotary wiper blades 520 are also shown in a vertical or home position in FIGS. 2 and 6A, and are shown in a horizontal position in FIGS. 3, 6B, 7, and 9. As an example, the home position may be the resting position for the rotary blade 520, while not in use. An advantage may be that, while in the home position, the rotary blade 520 may provide a minimal amount of resistance to the normal flow of water occurring within the self-cleaning salt cell housing during normal or regular use.

Again, the rotary wiper may be constructed from non-metallic, hard plastic, or any other suitable material that is sufficiently durable enough to withstand rotating cleaning cycles.

Figure 6A:
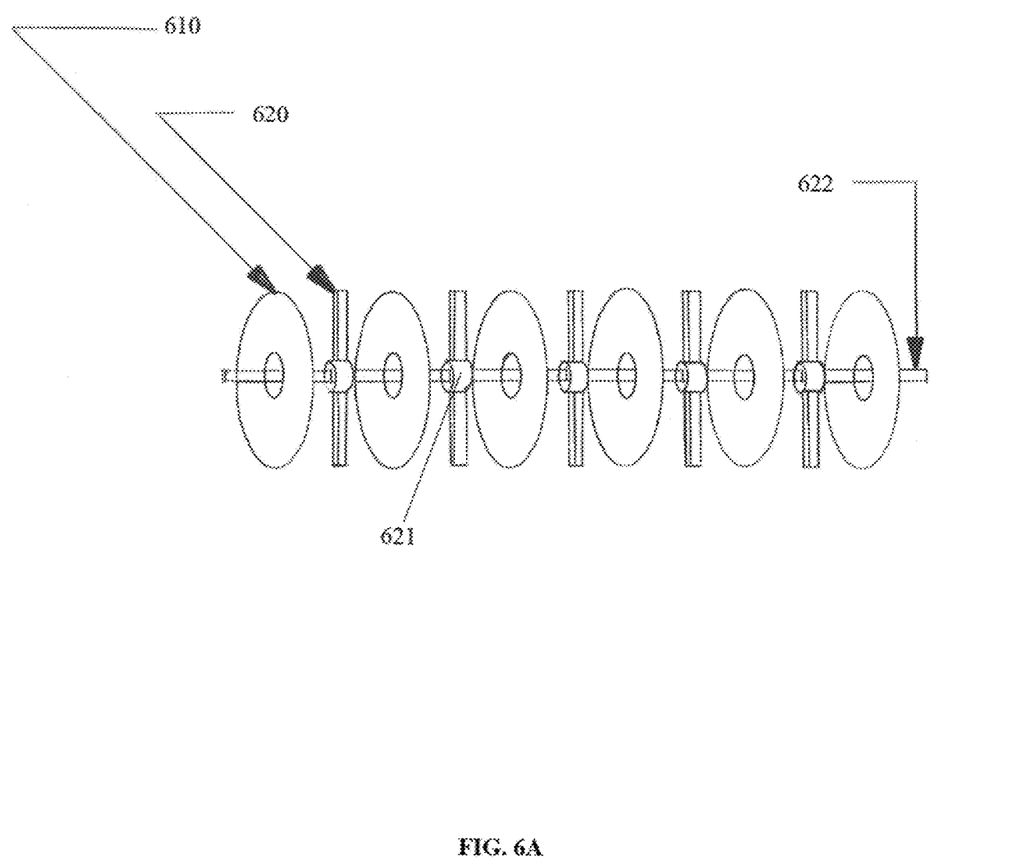
FIGS. 6A-6B illustrate an exploded, side perspective view and an assembled side elevation view, respectively, of an assembly having a drive shaft, rotary wipers and electrode plates, according to an aspect.
Figure 6B:
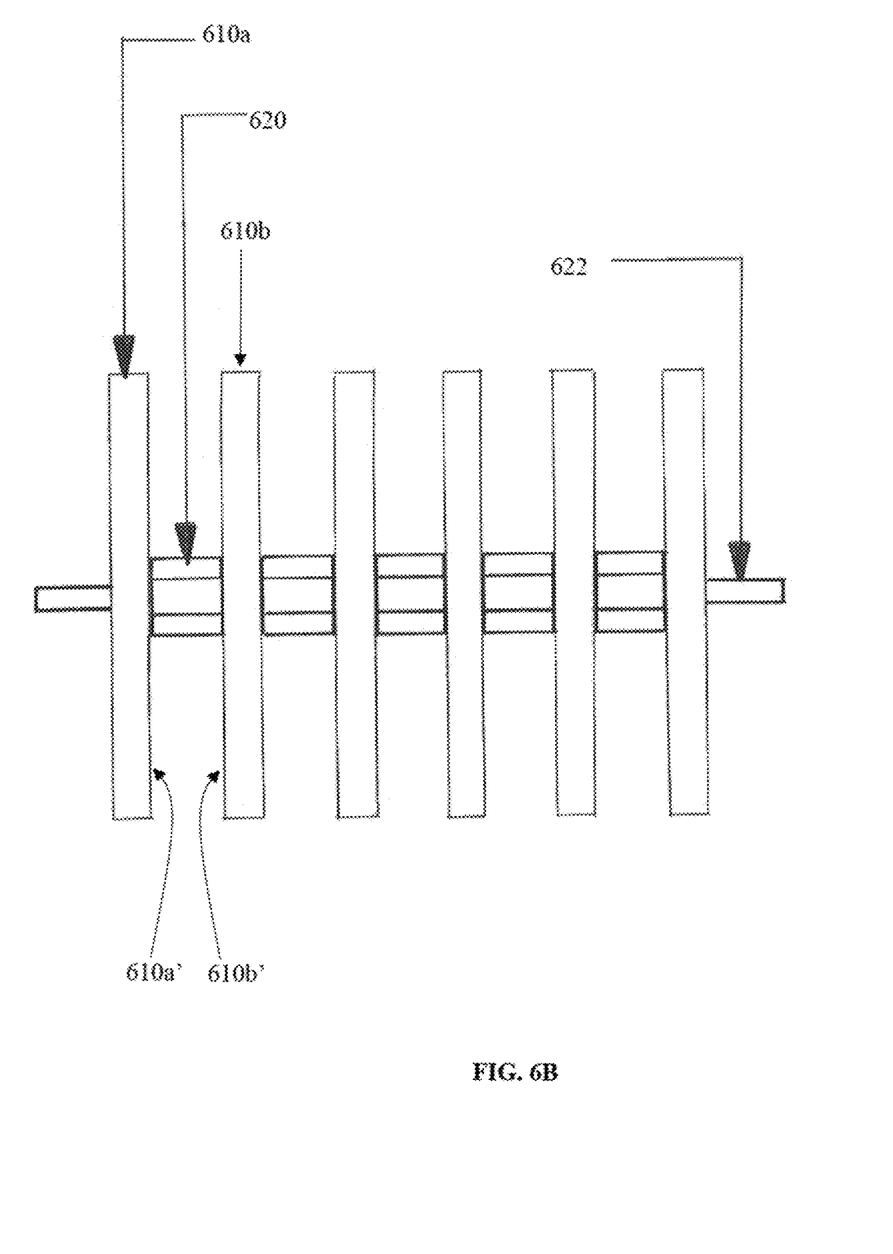

FIGS. 6A-6B illustrate an exploded, side perspective view and an assembled side elevation view, respectively, of an assembly having a drive shaft 622, rotary wipers 620 and electrode plates 610, according to an aspect. The assembly shown may be used for a self-cleaning salt cell, as shown and described when referring to FIGS. 1-3. The rotary wipers 620 are shown in a vertical position in FIG. 6A, and are shown in a horizontal position in FIG. 6B. The electrode plates 610 are shown without electrode tabs (shown by 411 in FIG. 4) or mounting tabs (shown by 413 in FIG. 4), for visual clarity.

The drive shaft 622 may be inserted through the cutout of a slotted hub (as shown and described in detail when referring to FIGS. 5A-5B), and next inserted through the center hole of an electrode plate. The electrode plates 610 and rotary wipers 620 may be arranged such that, when fully assembled together, the rotary wiper 620 may scrape residual material and buildup off of two electrode plates simultaneously. A rotary wiper 620 may make contact with a front face of a first electrode plate while making contact with a rear face of a second electrode plate, for example.

When the electrode plate and rotary wipers are assembled as shown as an example in FIG. 6B, the rotary wiper 620 may be sandwiched between two electrode plates such as the electrode plates 610*a* and 610*b*, such that, again, the rotary wiper 620 makes contact with the front face 610*b*' of the electrode plate 610*b* and makes contact with the rear face 610*a*' of the electrode plate 610*a*. The above components may be mounted to the end plates (as shown in FIG. 2).

Figure 7:
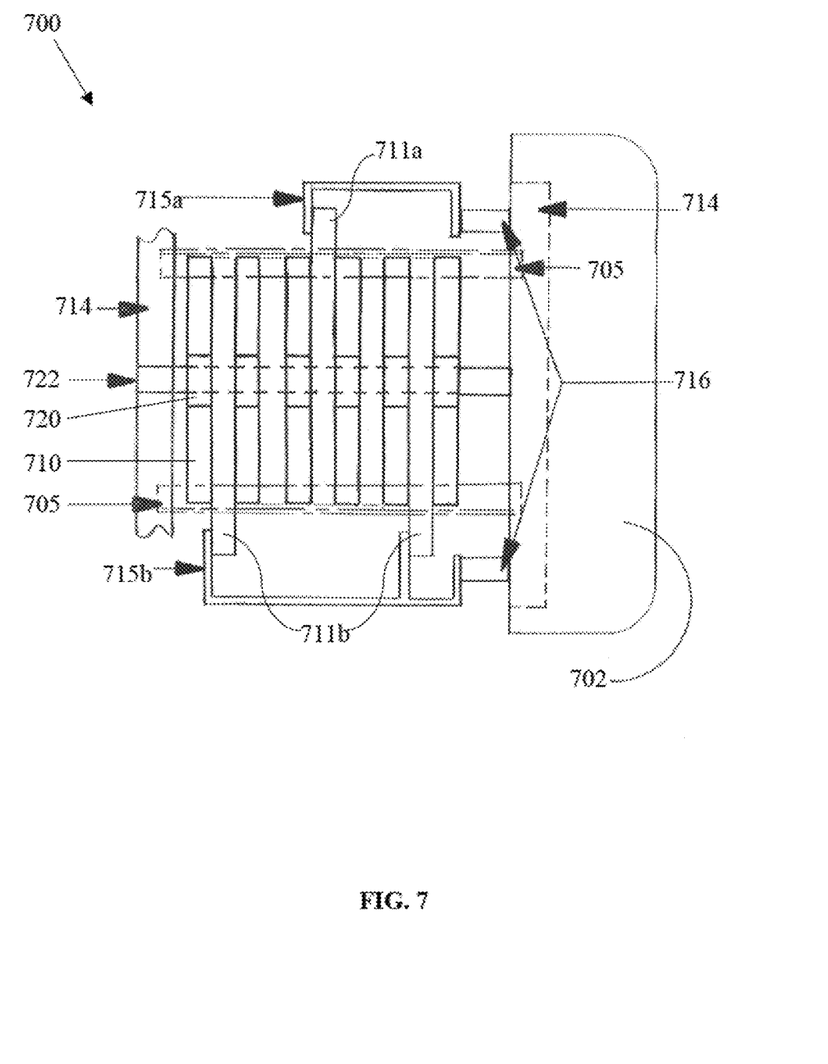
FIG. 7 illustrates a partial side sectional view of a self-cleaning salt cell, according to an aspect.

FIG. 7 illustrates a partial side sectional view of a self-cleaning salt cell 700, according to an aspect. FIG. 7 shows how the rotary wiper 720, the electrode plate 710, and the drive shaft 722 configuration disclosed when referring to FIG. 6B may be associated with other components of a self-cleaning salt cell 700.

The mounting rails 705 may be secured to the mounting tabs (shown by 413 in FIG. 4) of the electrode plates 710, such that the mounting rails 705 hold together the configuration disclosed when referring to FIG. 6B. Furthermore, the mounting rails 705 and the drive shaft 722 may be secured to the end plates 714, which are in turn secured to the covers 702 of the cell housing. The end plates 714 may secure both ends of the drive shaft 722 by using adaptors to fit into shaft bearings, flanges and shaft seals with O-ring having requisite placements to effectively enable rotating and sealing the internal components from internal to external leakage of pool water.

The electrode busbars 715*a* and 715*b* may also be secured to an end plate 714 via the electrode posts 716, as shown in FIG. 7. It should be noted that the electrode posts 716 may electrically insulate the electrode busbars 715*a* and 715*b* from the end plate 714. Fastener hardware may be used to associate together the end plates 714 and the electrode busbars 715*a* and 715*b*. As mentioned hereinbefore, the electrode busbars 715*a* and 715*b* may transmit an electric charge from the control panel (shown by 106 in FIG. 1) to the electrode plates 710. As shown in FIG. 7, the electrode busbar 715*a* may contact the anode electrode tab 711*a* and the electrode busbar 715*b* may contact the cathode electrode tabs 711*b*. Thus, the electrode busbars 715*a* and 715*b* may transfer the electric charge to the electrode plates 710 via the electrode tabs 711*a* and 711*b*.

It should be understood that the electrode busbars 715*a* and 715*b* may vary in size, shape, and material depending on the quantity of electrode plates 710 within the self-cleaning salt cell 700. Additionally, the placement of an electrode buss 715 may vary. It should also be understood that the housing may be weather-protected with the use of O-rings.

Figure 8:
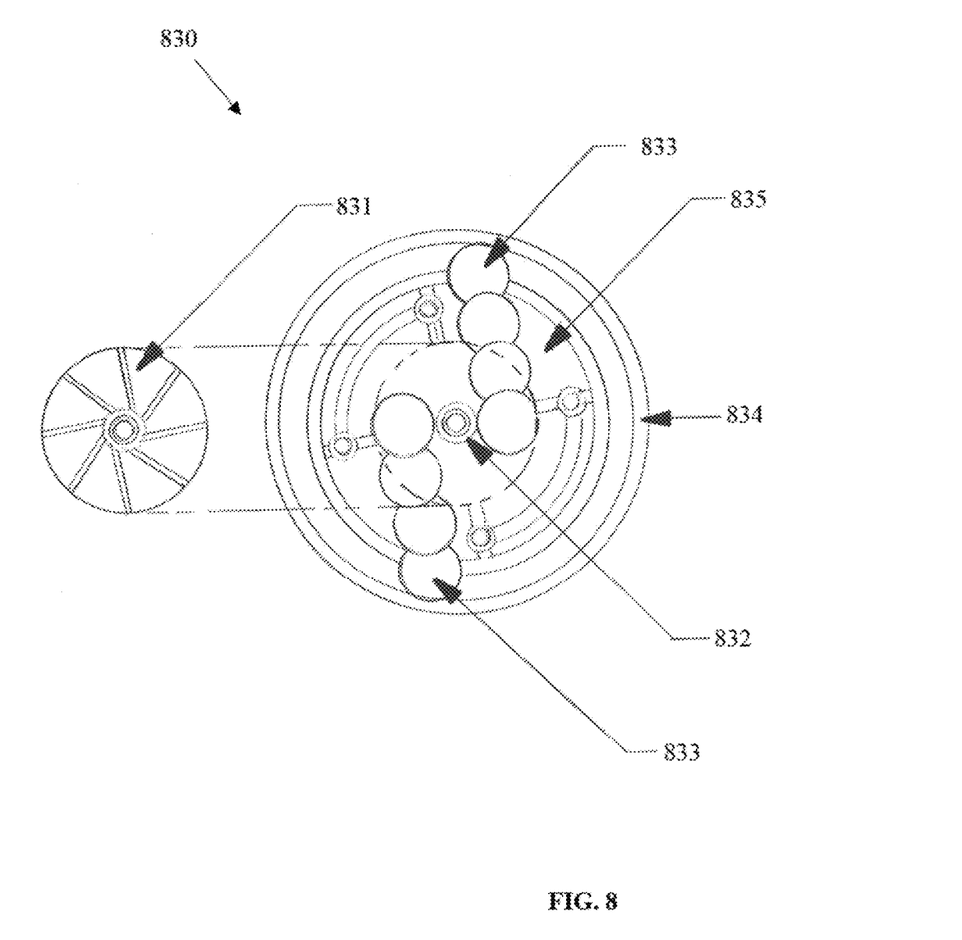
FIG. 8 illustrates a partial exploded rear view of a hydro-mechanical drive, according to an aspect.

FIG. 8 illustrates a partial exploded rear view of a hydro-mechanical drive 830, according to an aspect. As an example, a hydro-mechanical drive 830 may be used in a pool system using a self-cleaning salt cell. The hydro-mechanical drive 830 may be an off-the-shelf item and may be easily adaptable to drive the drive shaft 722 for a self-cleaning salt cell (as shown by 700 in FIG. 7). The hydro-mechanical drive 830 may be self-sustained drive system, requiring no external power, electronica or programming, for example.

The hydro-mechanical drive 830 may continuously run when the pool equipment controls call for pool water circulation. This mechanical system may continuously clean the electrode plates 710 by turning the rotary wipers 720 via the turning of the drive shaft 722.

Hydro-mechanical drive 830 may use hydraulic water power through the impeller 831. The impeller 831 may be directly attached by the impeller gear 832 to the speed-reducing gears 833 to the drive plate 835 and stationary gear ring 834, as is known to those of ordinary skill in the art.

The impeller gear 832 may turn at a higher rate of speed, which may be reduced with the rotation of the final speed-reducing gear 833 to mesh with the stationary gear 834, which may be attached to the drive plate 835.

Figure 9:
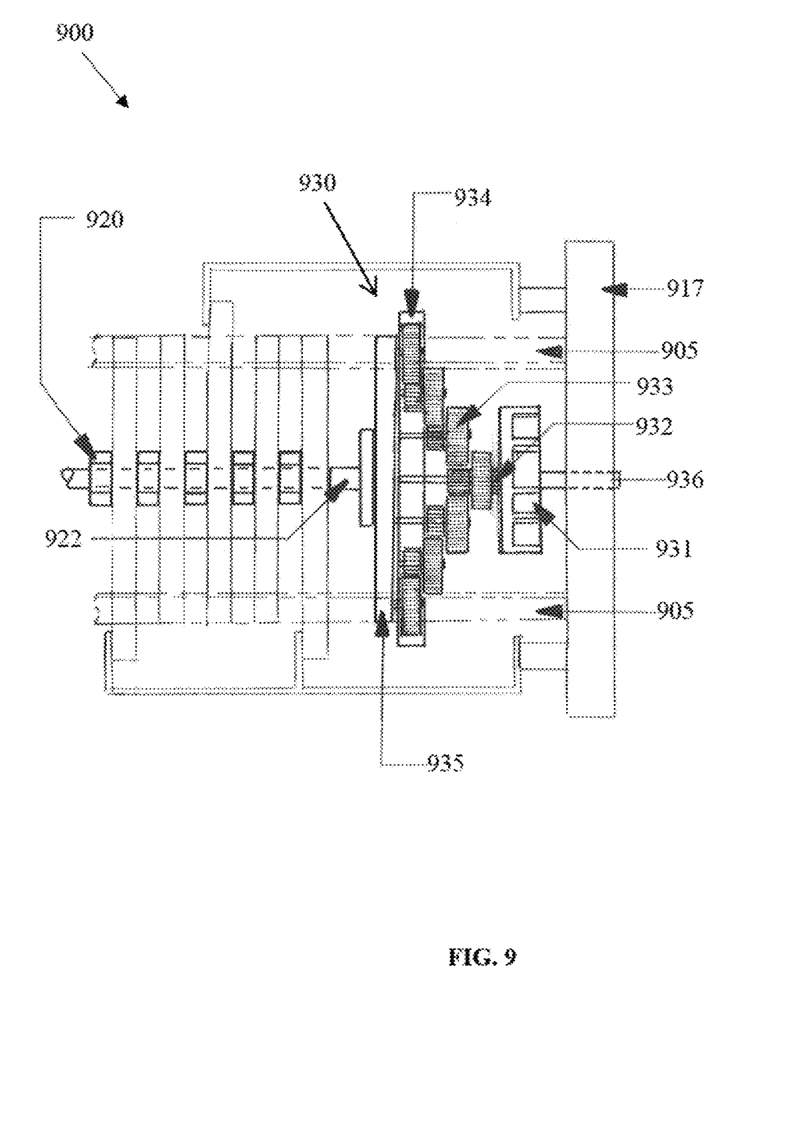
FIG. 9 illustrates a partial sectional view of another example of a self-cleaning salt cell, wherein a hydromechanical drive is used to drive the rotary wipers, according to an aspect.

FIG. 9 illustrates a partial sectional view of another example of a self-cleaning salt cell 900, wherein a hydro-mechanical drive 930 is used to drive the rotary wipers 920, according to an aspect. As shown as an example, a hydro-mechanical drive 930 may be used in place of a drive motor (such as the example shown by 324 in FIG. 3). As an example, mounting rails 905 (represented by broken lines) may be used to secure the stationary gear ring 933 of the hydro-mechanical drive 830 in place. Additionally, the other end of the hydro-mechanical drive 930 may be secured with an alignment pin 936, which may be secured to the end plate 917, as shown.

The speed-reducing gears 933 (i.e., the left-most upper and lower gears), which may mesh with the stationary gear ring 934, may turn inside the stationary gear ring 934, thus turning the drive plate 935. Then, the drive plate 935 may rotate the drive shaft 922.

The primary speed-reducing gears (i.e., the right-most middle gears), may be in direct contact with the impeller gear 932, which may rotate all the speed-reducing gears 933 of the impeller 931. It should be noted that all the speed-reducing gears 933 may be standoff mounted to the drive plate 935, as is known to those of ordinary skill in the art. When the speed-reducing gears 933 turn in place, they may provide substantial speed reduction to the drive plate 935. As an example, a 50:1 ratio of the impeller 931 to stationary gear 934 may be used.

It should be understood that the drive plate 935 may be attached to the drive shaft 922, such that the drive plate 935 may turn the drive shaft 922 in order to turn the rotary wipers 920.

A salt cell chlorinator adapted to run a self-cleaning program to self-clean by scraping off residual buildup may be installed by a user within a pool system (such as the system shown as an example in FIG. 1) and the control panel may be used to customize the programs of the salt cell chlorinator such that the salt cell chlorinator may be automatically maintained and cleaned. A user may program the salt cell chlorinator by using the control panel to customize the self-cleaning program to run at the predetermined time interval, wherein the self-cleaning program is set to run for a predetermined length of time; and may set the salt cell chlorinator using the control panel to run the chlorination program, wherein the chlorination program is adapted to stop when the self-cleaning program is running, and wherein the chlorination program is adapted to restart when the self-cleaning program is finished. As an example, the predetermined time interval may be 14 days, and the self-cleaning program predetermined length of time may be two minutes.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A salt cell chlorinator adapted to run a chlorination program of swimming pool or spa water, the chlorination program occurring by converting saltwater entering the salt cell chlorinator to chlorine water, the salt cell chlorinator being further adapted to run a self-cleaning program to self-clean by scraping off residual buildup, the salt cell chlorinator comprising:
   a housing having:
      a front end;
      a rear end;
      a top side;
      a bottom side;
      a water inlet pipe; and
      a water outlet pipe;
   a plurality of electrodes arranged a line within the housing,
      each electrode of the plurality of electrodes having:

a first face; and
a second face, which is opposed to the first face;
a plurality of rotary wipers,
wherein each rotary wiper of the plurality of wipers is arranged within the line of the plurality of electrodes, such that each rotary wiper of the plurality wipers is adapted to make contact with at least one electrode of the plurality of electrodes,
wherein at least one rotary wiper of the plurality of rotary wipers is positioned between two adjacent electrodes of the plurality of electrodes and thus adapted to rotate simultaneously on the first face of one of the two adjacent electrodes and on the second face of the other of the two adjacent electrodes;
a drive motor adapted to cause a rotation of the plurality of rotary wipers;
a control panel adapted to customize the self-cleaning program to run at a predetermined time interval;
wherein the residual buildup is formed on the plurality of electrodes during running of the chlorination program;
wherein the rotation of the plurality of rotary wipers removes the residual buildup from the plurality of electrodes; and
wherein the predetermined time interval occurs between occurrences of the chlorination program.

2. The salt cell chlorinator of claim 1, further comprising:
a front cover adapted to fit on the front end; and
a rear cover adapted to fit on the rear end;
such that the housing is enclosed by the front cover and the rear cover.

3. The salt cell chlorinator of claim 1, further comprising a plurality of mounting rails;
wherein the plurality of electrodes is arranged in the line by being mounted onto the plurality of mounting rails.

4. The salt cell chlorinator of claim 1, further comprising:
a first busbar; and
a second busbar;
wherein the first busbar and the second busbar are adapted to transfer an electric charge from the control panel to the plurality of electrodes.

5. The salt cell chlorinator of claim 4, each electrode of the plurality of electrodes further comprising:
an outer edge; and
an electrode tab extending outwards from the outer edge;
wherein each electrode of the plurality of electrodes makes contact with the first busbar or the second busbar via the electrode tab.

6. The salt cell chlorinator of claim 1, further comprising a drive shaft passing through each electrode of the plurality of electrodes and passing through each rotary wiper of the plurality of rotary wipers;
wherein the drive motor rotates the drive shaft;
such that the rotation of the plurality of rotary wipers is caused.

7. The salt cell chlorinator of claim 1,
each electrode of the plurality of electrodes having a diameter; and
each rotary wiper of the plurality of rotary wipers further comprising:
a first end;
a second end;
a center portion at a midpoint between the first end and the second end;
a first blade; and
a second blade opposite to the first blade;
wherein a length between the first end and the second end is equal to the diameter.

8. A salt cell chlorinator adapted to run a chlorination program of swimming pool or spa water, the chlorination program occurring by converting saltwater entering the salt cell chlorinator to chlorine water, the salt cell chlorinator being further adapted to run a self-cleaning program to self-clean by scraping off residual buildup, the salt cell chlorinator comprising:
a housing having:
a front end;
a rear end;
a top side;
a bottom side;
a water inlet pipe; and
a water outlet pipe;
a plurality of electrodes arranged a line within the housing,
each electrode of the plurality of electrodes having:
a first face; and
a second face, which is opposed to the first face;
a plurality of rotary wipers,
wherein each rotary wiper of the plurality of wipers is arranged within the line of the plurality of electrodes, such that each rotary wiper of the plurality wipers is adapted to make contact with at least one electrode of the plurality of electrodes,
wherein at least one rotary wiper of the plurality of rotary wipers is positioned between two adjacent electrodes of the plurality of electrodes and thus adapted to rotate simultaneously on the first face of one of the two adjacent electrodes and on the second face of the other of the two adjacent electrodes;
a drive motor adapted to cause a rotation of the plurality of rotary wipers;
a drive shaft passing through each electrode of the plurality of electrodes and passing through each rotary wiper of the plurality of rotary wipers;
a control panel adapted to customize the self-cleaning program to run at a predetermined time interval;
wherein the residual buildup is formed on the plurality of electrodes during running of the chlorination program;
wherein the drive motor rotates the drive shaft;
such that the rotation of the plurality of rotary wipers is caused;
wherein the rotation of the plurality of rotary wipers removes the residual buildup from the plurality of electrodes; and
wherein the predetermined time interval occurs between occurrences of the chlorination program.

9. The salt cell chlorinator of claim 8, further comprising:
a front cover adapted to fit on the front end; and
a rear cover adapted to fit on the rear end;
such that the housing is enclosed by the front cover and the rear cover.

10. The salt cell chlorinator of claim 8, further comprising a plurality of mounting rails;
wherein the plurality of electrodes is arranged in the line by being mounted onto the plurality of mounting rails.

11. The salt cell chlorinator of claim 8, further comprising:
a first busbar; and
a second busbar;
wherein the first busbar and the second busbar are adapted to transfer an electric charge from the control panel to the plurality of electrodes.

12. The salt cell chlorinator of claim 11, each electrode of the plurality of electrodes further comprising:
an outer edge; and an electrode tab extending outwards from the outer edge;
wherein each electrode of the plurality of electrodes makes contact with the first busbar or the second busbar via the electrode tab.

13. The salt cell chlorinator of claim 11,
each electrode of the plurality of electrodes having a diameter; and
each rotary wiper of the plurality of rotary wipers further comprising:
a first end;
a second end;
a center portion at a midpoint between the first end and the second end;
a first blade; and
a second blade opposite to the first blade;
wherein a length between the first end and the second end is equal to the diameter.

14. A method of maintaining a salt cell chlorinator in a pool system, the salt cell chlorinator being adapted to run a chlorination program of swimming pool or spa water, the chlorination program occurring by converting saltwater entering the salt cell chlorinator to chlorine water, the salt cell chlorinator being further adapted to run a self-cleaning program to self-clean by scraping off residual buildup, and the salt cell chlorinator comprising:
a housing having:
a front end;
a rear end;
a top side;
a bottom side;
a water inlet pipe; and
a water outlet pipe;
a plurality of electrodes arranged a line within the housing,
each electrode of the plurality of electrodes having:
a first face; and
a second face, which is opposed to the first face;
a plurality of rotary wipers,
wherein each rotary wiper of the plurality of wipers is arranged within the line of the plurality of electrodes, such that each rotary wiper of the plurality wipers is adapted to make contact with at least one electrode of the plurality of electrodes,
wherein at least one rotary wiper of the plurality of rotary wipers is positioned between two adjacent electrodes of the plurality of electrodes and thus adapted to rotate simultaneously on the first face of one of the two adjacent electrodes and on the second face of the other of the two adjacent electrodes;
a drive motor adapted to cause a rotation of the plurality of rotary wipers;
a control panel adapted to customize the self-cleaning program to run at a predetermined time interval;
wherein the residual buildup is formed on the plurality of electrodes during running of the chlorination program;
wherein the rotation of the plurality of rotary wipers removes the residual buildup from the plurality of electrodes; and
wherein the predetermined time interval occurs between occurrences of the chlorination processes;
the method comprising the steps of:
installing the salt cell chlorinator in the pool system;
programming the salt cell chlorinator using the control panel to customize the self-cleaning program to run at the predetermined time interval, wherein the self-cleaning program is set to run for a predetermined length of time; and
setting the salt cell chlorinator using the control panel to run the chlorination program, wherein the chlorination program is adapted to stop when the self-cleaning program is running, and wherein the chlorination program is adapted to restart when the self-cleaning program is finished.

15. The method of claim 14, wherein the predetermined time interval is 14 days.

16. The method of claim 14, wherein the predetermined length of time is two minutes.

17. The method of claim 14, wherein the rotation of the plurality of rotary wipers occurs during the predetermined length of time.

18. The method of claim 14,
each electrode of the plurality of electrodes having a diameter; and
each rotary wiper of the plurality of rotary wipers further comprising:
a first end;
a second end;
a center portion at a midpoint between the first end and the second end;
a first blade; and
a second blade opposite to the first blade;
wherein a length between the first end and the second end is equal to the diameter.

19. The method of claim 18, wherein the first blade is adapted to point towards the top side and the second blade is adapted to point towards the bottom side when the chlorination program is running and when the self-cleaning program is not running.

20. The method of claim 14, the salt cell chlorinator further comprising:
a first busbar; and
a second busbar;
wherein the first busbar and the second busbar are adapted to transfer an electric charge from the control panel to the plurality of electrodes.

* * * * *